Patented May 27, 1941

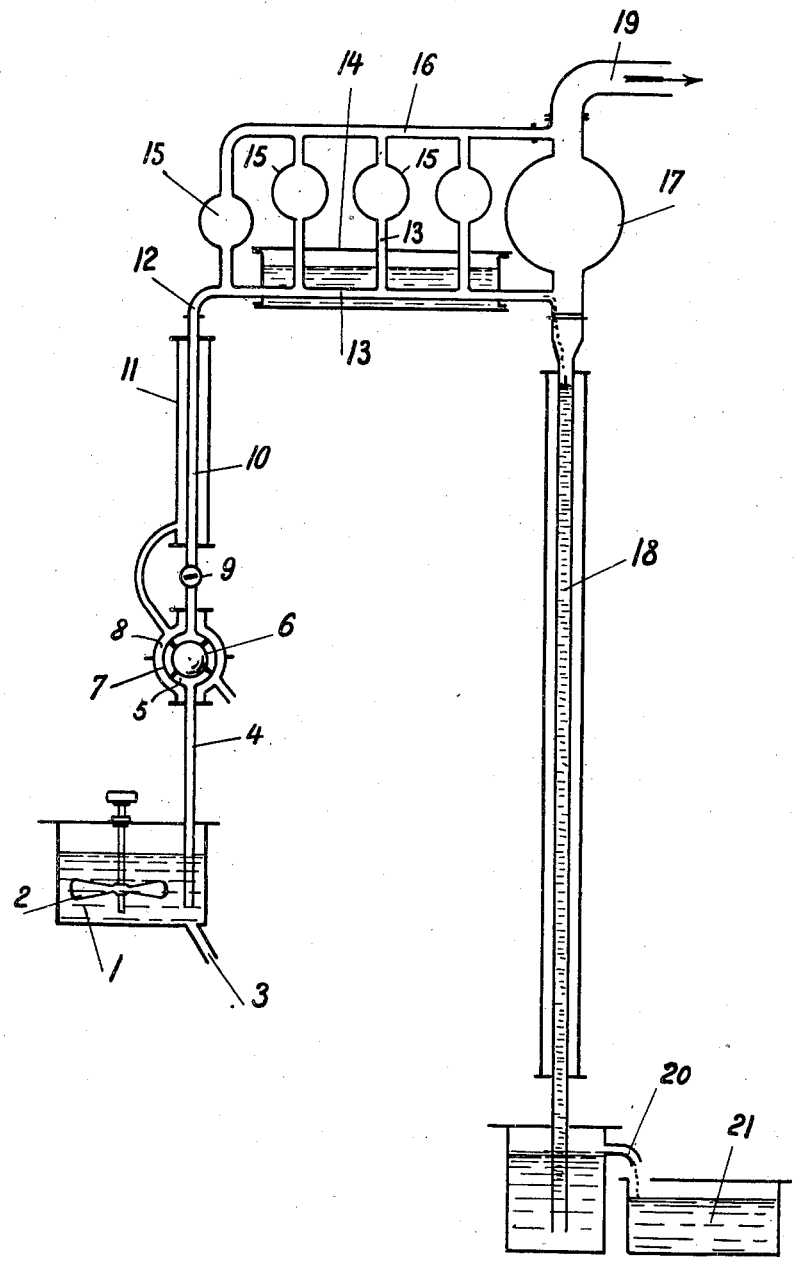

2,243,810

UNITED STATES PATENT OFFICE 2,243,810

PROCESS FOR THE CONTINUOUS PRODUCTION OF HYDROGEN PEROXIDE FROM POTASSIUM PERSULPHATE

Modeste Salleras, Fismes, France, assignor to Buffalo Electro-Chemical Company, Inc., a corporation of New York Application May 13, 1937, Serial No. 142,506
In France October 6, 1936

4 Claims. (Cl. 23—207)

The methods for producing hydrogen peroxide may be classified in two groups: the continuous or cyclic methods, using a solution of persulphuric acid or ammonium persulphate as a starting material, and the discontinuous methods which start from potassium persulphate.

In connection with the continuous methods, it is known that with the electrolytic manufacture of ammonium persulphate the efficiency decreases very rapidly with the concentration of the solution obtained.

Since, however, the production and rapid evaporation of hydrogen peroxide necessitate a certain concentration of the solutions treated, a great quantity of water must be evaporated in a very short time: this requires the use of metallic heat exchangers which, acting catalytically on the hydrogen peroxide, diminishes the efficiency of the process.

In the usual cyclic processes, hydrogen peroxide should therefore be removed from the mixture by a very rapid evaporation as soon as it is formed, to avoid attacks by Caro's acid and by the catalysts decomposing the mixture: this is however impossible, as the boiling point of the solutions of persulphuric acid or ammonium persulphate yielded by electrolysis is lower than the boiling point of the hydrogen peroxide, the evaporation of which does not proceed quickly enough.

However, with the apparatus operating continuously, labor saving is important for the reason inherent to its continuous working, whereas with the apparatus used in the discontinuous methods an additional number of workmen are required for emptying and recharging the reaction retort at each operation. Besides, the retort, generally made of sandstone or silica, is liable to be broken every time.

Also, in spite of the renewal of the joints, and owing to frequently connecting the retort to the condensation system, the tightness of the joints will prove imperfect and the admission of air may lead to an increase of the pressure into the apparatus.

The discontinuous methods show however a greater efficiency and require less heat than those of the first group; moreover, the apparatus for carrying out these methods may employ ceramics, silica or glass, which have no catalytic noxious action on hydrogen peroxide, these advantages being due to the possible use of aqueous solutions of sulphuric acids of a higher concentration than in the processes of the first group.

Certain inventors claim that it is possible, with the cyclic processes, to use any persulphate as a starting material (and more particularly potassium persulphate) in the same way as ammonium persulphate is made use of, that is, in the soluble state (see for instance U. S. Patents Nos. 1,851,961, 1,924,954 and 2,067,364).

This view is however contrary to the facts, as proven by practical experience: The potassium persulphate is very slightly soluble in the aqueous solution of sulphuric acid acting as a catalyst of hydrolysis; therefore the reaction of hydrolysis:

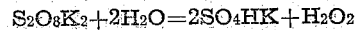
$$S_2O_8K_2 + 2H_2O = 2SO_4HK + H_2O_2$$

cannot take place at a speed necessary for the operation to be carried out continuously. As a matter of fact, there is too little contact surface between the potassium persulphate in a solid state which precipitates very rapidly and the sulphuric acid solution to bring about a rapid reaction: an important part of the unreacted potassium persulphate would thus be liable to pass into the residue.

On the other hand, to obtain a good efficiency with the present continuous methods, it is necessary that the composition of the mixture (water, potassium persulphate and sulphuric acid) introduced into the apparatus varies only between very narrow limits. This is however impossible, as the potassium persulphate is very slightly soluble in the aqueous solution of sulphuric acid used.

Although it is possible to dissolve all the potassium persulphate at a temperature lower than 100° C. by considerably increasing the quantity of aqueous solution of sulphuric acid, it must be remembered that the operation is continuous and the process would be impractical on account of the enormous quantity of water to be evaporated.

The object of the present invention is the production of hydrogen peroxide in a continuous way from potassium persulphate. This new method eliminates all the inconveniences of the known continuous and discontinuous systems, maintaining at the same time all their advantages. The efficiency of this new process exceeds 95% of the theoretical efficiency.

One of the features of the invention consists in bringing the potassium persulphate, in a finely divided state, into an aqueous solution of sulphuric acid and maintaining it therein in suspension, homogenously distributed throughout the liquid mass. This feature constitutes the first phase of the process.

Another feature of the invention, which forms the second phase of the process, resides in forming a permonosulphuric acid and localizing the attack of the persulphate in a heated space or chamber.

Yet another feature of this invention, forming the third phase of the process, comprises the concentration of the solution obtained in a vertical tube.

Still another feature of the invention, which forms the fourth phase of the process resides in producing and evaporating hydrogen peroxide, concentrating at the same time the mixture in a horizontal tube according to the formula:

$$SO_5H_2 + H_2O = H_2O_2 + SO_4H_2$$

Other features of the invention will become more apparent as the description proceeds, the annexed drawing illustrating, by way of example, diagrammatically, an apparatus wherein the process for the continuous production of hydrogen peroxide from potassium persulphate may be accomplished.

In this drawing:

A mixer 1 is fed continuously with a 50% aqueous solution of sulphuric acid and potassium persulphate by means of known mechanical devices not shown in the drawing.

This mixer 1 consists of a receiver made of sandstone or lead wherein an open screw or propeller 2 rotating at more than 700 R. P. M. produces a very vigorous stirring. Moreover, compressed air is injected into the receiver by means of the lower tube 3 to agitate the mixture. This air escapes to the atmosphere.

This mixing operation disaggregates the crystal agglomerations and the crystals themselves by finely dividing the potassium persulphate, whereas the injected compressed air still further increases the action of the stirring and causes small air bubbles to adhere to the broken crystal particles, thus constituting a very homogenous mixture with a perfect suspension of potassium persulphate in the aqueous solution of sulphuric acid.

A lead tube 4 dips into the mixer 1 and feeds the hydrolyser. A vacuum being maintained in the apparatus by a vacuum pump, the mixture rises under the action of atmospheric pressure through tube 4 and chamber 5 where the dissolution and reaction of the potassium persulphate takes place.

Chamber 5 contains two concentric leaden spheres 6, 7, between which passes the mixture of water, sulphuric acid and potassium persulphate. This chamber is heated externally by means of a steam jacket or any other system. A cock 9 mounted in the vertical tube 10 placed over chamber 5 serves to control the feeding of the apparatus. This cock is never completely closed. The object thereof is to regulate the feed of the mixture. The feed is a function of the temperature transmitted to the mixture through the steam jacket. Practically, it is not possible to work with an absolutely constant temperature. Therefore, when the temperature goes down, it is necessary to diminish the flow.

In chamber 5 the velocity of flow of the mixture will decrease, as the cross section of this chamber is greater than that of tube 4. This will allow sufficient time for reacting the potassium persulphate which, being in a finely divided state, presents a great surface of attack, thus compensating its weak solubility in the sulphuric acid.

Moreover, the large heating surface of chamber 5 facilitates the transmission of heat and allows the formation of the permonosulphuric acid as well as the dissolution of the potassium persulphate according to the formula:

$$S_2O_8K_2 + SO_4H_2 + H_2O = SO_5H_2 + SO_4HK$$

The temperature inside the chamber 5 is about 75° C., whereas in the steam jacket surrounding said chamber the temperature is about 100° C.

Cock 9 has an opening of very reduced cross-section, thus preventing the outlet of vapours and assuring a pressure allowing the temperature of the mixture to be increased, and consequently the dissolution of the persulphate, without attaining the boiling point of the mixture.

It is known that potassium persulphate is very difficultly soluble in sulphuric acid. It is equally known that the dissolving power of a liquid is directly proportional to the temperature and, inversely, proportional to the concentration.

It is for increasing the temperature without reaching a boiling (which rapidly concentrates the solution) that the section of the passage is reduced by the valve 9 in order to create a vapor pressure below the valve—that is to say, in the space comprised between the two concentric spheres. The inventor has preferred a valve rather than a tube of reduced section, because this valve serves equally to regulate the rate of flow through the apparatus. The valve is opened more or less for this regulation during the operation, according to the circumstances of temperature and pressure.

In chamber 5 the greatest part of the persulphate has now been transformed. The mixture passes then in tube 10 made of "Pyrex" glass or a similar material and heated externally by a steam jacket 11 or other means. There is a sufficient difference in pressure on opposite sides of valve 9 that when the mixture enters tube 10 and is subjected to further heating, concentration is effected without flashing of the mixture. In tube 10 the mixture is concentrated by evaporation of water and the reaction and dissolution of the suspended potassium persulphate is completed with formation of a negligible quantity of hydrogen peroxide. The mixture flows then through the bended tube 12 into tube 13 forming an angle of about 80° with the vertical tube 10. In this tube 13 also of "Pyrex" glass, heated externally by a steam jacket 14 or other means, hydrogen peroxide is formed and the mixture is concentrated to increase its boiling point and obtain a boiling temperature above that of the hydrogen peroxide, thus allowing the evaporation of the hydrogen peroxide as it is produced.

Tube 13 is slightly inclined in order to prevent, on account of the variation in the feeding, the mixture containing hydrogen peroxide from flowing back into the vertical tube 10 where it might be destroyed by the action of Caro's acid. In the tube 10, the mixture containing Caro's acid has a boiling point lower than that of hydrogen peroxide which makes it difficult for the latter to evaporate and allows sufficient time for its destruction by the permonosulphuric acid, according to the reaction:

$$SO_5H_2 + H_2O_2 = SO_4H_2 + H_2O + O_2$$

To prevent part of the hydrogen peroxide vapours produced in tube 13 from being decomposed by the catalysts of the mixture, this tube communicates at several points of its length, by means of a range of tubes 15, with a second tube 16 extending parallel to and above tube 13. Tube 13 is of a size sufficient to permit the evolution of the hydrogen peroxide vapors and water vapor.

The residue and the hydrogen peroxide vapours pass into chamber 17 through tubes 13 and 16. In chamber 17 the vapors are separated from the residue which falls into a barometric column 18, whereas the water vapors and hydrogen peroxide vapours flow into a condensation system of any known type.

The chamber 17 serves to create an expansion preventing the residue from being carried away to tube 19. The residue passes through tube 18 and overflow 20 into tank 21, where the excess of sulphuric acid is separated from the residue and brought back in 1. The separation of the sulphuric acid from the residue may be effected by cooling the mixture, in which case crystals are deposited and separated by filtering or in some other well-known manner. The potassium acid sulphate is electrolyzed and, after transformation into potassum persulphate, is brought back in receiver 1 and recirculated. In chamber 17, the absolute pressure is 35–40 mm. of Hg., the temperature being 75 to 80° C.

By way of example, when treating 200 kgs. of a solution of sulphuric acid of 50% and 100 kgs. potassium persulphate, 40 kgs. hydrogen peroxide of 30% by weight (110 volumes) are obtained, which represents an efficiency of 96%: this result has never been obtained before in any known continuous process for producing hydrogen peroxide.

I claim:

1. An apparatus for the continuous manufacture of hydrogen peroxide from potassium persulphate, comprising a reservoir for the formation of a finely divided suspension of a mixture of potassium persulphate in water and sulphuric acid, a vertical tube extending down into said reservoir beneath the surface of the material contained therein, a chamber of large volume constituted by two concentric spheres into which the tube discharges, a heating jacket surrounding the exterior sphere, a second vertical tube above the chamber and connected therewith, a valve on said second tube, a heated jacket surrounding the second tube, and a conduit placing said second jacket in communication with that which surrounds the external sphere.

2. An apparatus for the continuous manufacture of hydrogen peroxide from potassium persulphate, comprising a reservoir for the formation of a finely divided suspension of potassium persulphate in an aqueous solution of sulphuric acid, a conduit for the discharge of said suspension from said reservoir, a chamber into which said conduit discharges, a tube extending upwardly from said chamber, means for reducing the cross-section of said tube, means for exteriorly heating the chamber and the tube, a horizontal tube slightly inclined connected to the upper extremity of said tube, means for heating the exterior of said horizontal tube for bringing it to a temperature above that of the boiling point of hydrogen peroxide, vertical tubes provided with enlargements extending from the upper part of said horizontal tube, a second horizontal tube communicating with said vertically extending tubes, a conduit for the discharge of hydrogen peroxide, and a barometric column for the discharge of the residue.

3. In a process for continuously manufacturing hydrogen peroxide from potassium persulphate, the steps comprising forming a finely divided suspension of a mixture of potassium persulphate, water and sulphuric acid, in which the suspended potassium persulphate is in a finely divided state in the solution of sulphuric acid, passing the suspension through a heated vessel at such a rate that the greater part of the potassium persulphate is converted at least to a less oxidized form of sulphate therein, discharging the mixture from said vessel through a constricted passage of regulatable cross section into a zone of subatmospheric pressure, maintaining the suspension in said vessel at a temperature below boiling by correlating the pressure in said vessel, determined by the size of said passage and the heat applied to said vessel, heating the mixture in said zone of subatmospheric pressure to a temperature sufficient to produce and vaporize hydrogen peroxide, and separating hydrogen peroxide from the residue.

4. In a process for continuously manufacturing hydrogen peroxide from potassium persulphate, the steps comprising forming a finely divided suspension of a mixture of potassium persulphate, water and sulphuric acid, in which the suspended potassium persulphate is in a finely divided state in the solution of sulphuric acid in a mixing chamber, passing the suspension through a heated vessel by applying suction thereto, said vessel being of a volume sufficient to diminish the speed of flow of the suspension and to give it a sufficient time for the conversion of the greatest part of the potassium persulphate at least to a less oxidized form of sulphate therein, and discharging the mixture from the heated vessel, through a constricted passage of regulatable cross section, into a zone of subatmospheric pressure, maintaining the suspension in said vessel at a temperature below boiling by correlating the pressure, determined by the size of said restricted passage, and the heat applied to said vessel, heating the mixture in said zone of subatmospheric pressure to a temperature sufficient to produce and vaporize $H_2O_2$ and separating $H_2O_2$ from the residue.

MODESTE SALLERAS.